UNITED STATES PATENT OFFICE.

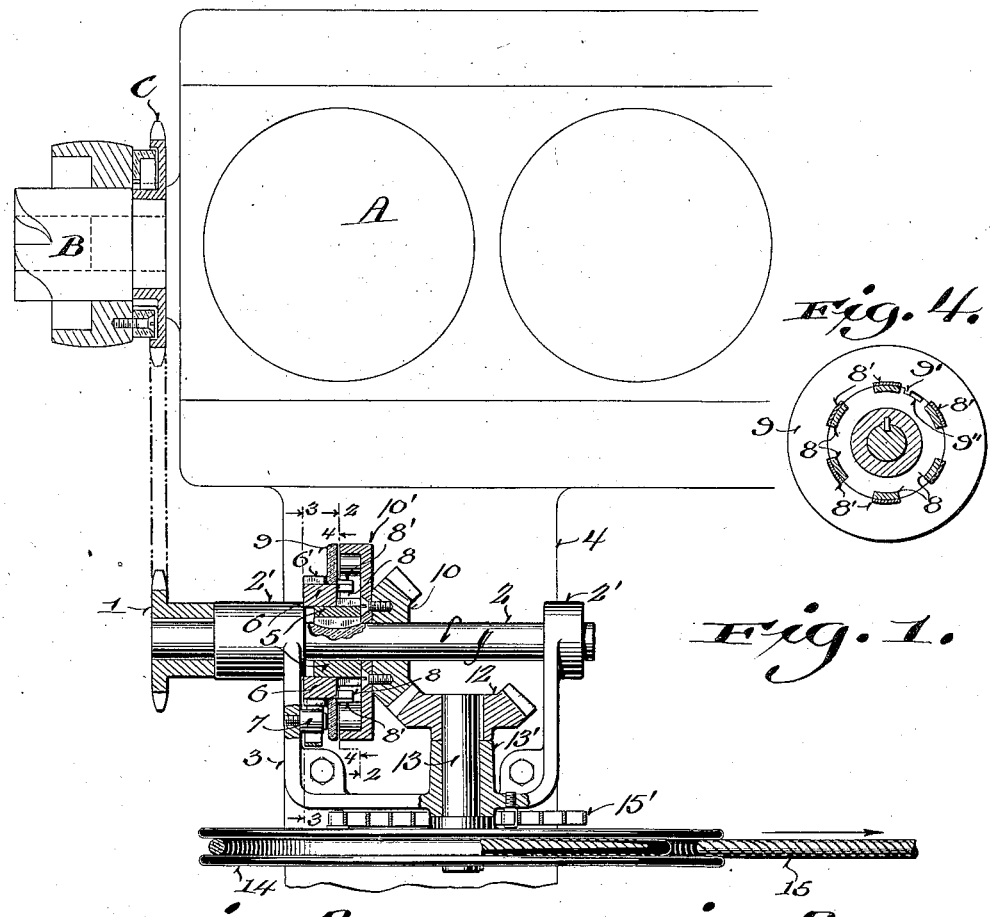

HENRY R. SIEVERKROPP, OF RACINE, WISCONSIN.

ENGINE-STARTER MECHANISM.

1,162,410.  Specification of Letters Patent.  Patented Nov. 30, 1915.

Application filed December 30, 1914. Serial No. 879,663.

*To all whom it may concern:*

Be it known that I, HENRY R. SIEVERKROPP, a citizen of the United States, and resident of Racine, in the county of Racine and State of Wisconsin, have invented certain new and useful Improvements in Engine-Starter Mechanism; and I do hereby declare that the following is a full, clear, and exact description thereof.

My invention has for its object to provide a simple economical and positively actuated engine starter mechanism embodying a back fire release clutch, particularly designed for application to gas engine starters of the pull type.

With the above object in view the invention consists in certain peculiarities of construction and combination of mechanical elements as set forth hereinafter with reference to the accompanying drawings and subsequently claimed.

In the drawings Figure 1 represents a plan view of an engine starter mechanism equipped with a clutch embodying the features of my invention, with parts broken away and in section as indicated by lines 1—1 of Figs. 2 and 3; Fig. 2, a detailed sectional view of the same, the section being indicated by line 2—2 of Fig. 1, looking in the direction of the associated arrows; Fig. 3, another sectional view, the section being indicated by line 3—3 of Fig. 1, and Fig. 4, still another detailed sectional view, the same being indicated by the line 4—4 looking in the direction of the arrows associated with said numerals.

Referring by characters to the drawings, A represents a gas engine diagrammatically expressed and B a clutch head fast upon the engine shaft carrying a driving sprocket C. Motion is imparted to the driving sprocket from a second sprocket 1 which is fixed upon a counter-shaft 2, the same being mounted in journals 2' of a bracket 3, which bracket is secured to a web or foot 4 that projects from the engine base. The shaft 2 is arranged to be normally rotated in the direction of the arrow, whereby a cranking movement is imparted to the engine shaft. Secured to the shaft 2 is a ratchet wheel 5, the hub of which ratchet wheel has loosely mounted thereon a collar 6 having peripheral ratchet teeth 6', the inclined faces of which are positioned in the same direction as the normal position of the shaft 2. These teeth are controlled by a spring-controlled dog 7, which dog is mounted upon the bracket 3, as best shown in Fig. 1. The collar 6 is also provided with a series of tongues 8 which project inwardly from one side face of said collar and mounted upon the periphery of the collar in abutting engagement with one side of the teeth 6' is an oscillatory disk 9, which disk is also provided with tongues 8' that are normally adapted to register with the collar tongues 8. Oscillatory movement of the disk 9 with relation to the collar is limited by means of a tooth 9', which tooth extends into an elongated indenture 9" that is formed between two of the collar tongues and upon the periphery of said collar. Hence this spline connection between the disk and collar permits relative movement of these parts, whereby the disk tongues 8 will have a shutter movement with relation to the collar tongues to partly close up the gaps between the latter.

Loosely mounted upon the shaft 2 is a gear-wheel 10 of the beveled tooth type having a hollow hub 10' which overhangs the teeth of the ratchet wheel 5 and carries a pair of spring-controlled pivotal dogs 11, the noses of which dogs extend between the contemporary tongues and engage the teeth of said ratchet-wheel, whereby the gear-wheel 10 is locked to the shaft when said gear wheel is rotated in its normal direction, as indicated by the arrows.

Motion is imparted to the gear-wheel 10 by a similar beveled gear-wheel 12 which is fast upon an arbor 13 that is journaled in a bearing 13' forming part of the bracket 3. The outer end of the arbor has secured thereto a spring drum 14 having one end of a cable or runner 15 secured thereto, whereby rotation of the drum is effected in one direction in opposition to a coiled spring 15', which connects the drum and bracket. Thus when the drum is rotated in one direction it winds the spring and, when released, said spring will reverse the rotation of said drum and its arbor whereby the parts return to their normal position of rest after a starting operation.

From the foregoing description it will be manifest that when motion is imparted to the shaft 2 in the direction indicated by the arrow through the connection of the ratchet-wheel 5 and gear-wheel 10, it is understood that the disk 9, owing to its spline connection with the collar, will also revolve and maintain its tongues in alinement with those of said collar, whereby all of said parts will revolve with the shaft and the motion imparted thereto will be transmitted to the crank-shaft of the engine to cause a starting operation. Should back-fire occur whereby the direction of rotation of the shaft tends to reverse, it is obvious that the collar 6 will be held against movement by its dog 7. The reverse movement upon the shaft will be momentarily transferred from the ratchet wheel 5 to the hub of the gear-wheel 10 through the dogs 11 and this back movement of the dogs will cause them to recede from engagement with the teeth of the ratchet wheel 5 due to the fact that the tongues 8 and 8' will have a camming action to lift said dogs as they travel in a reverse direction. Hence when this movement takes place there is a slight oscillatory movement between the disk 9 and collar, whereby the gaps between the tongues 8 are partly closed by the tongues 8' to prevent the nose portions of the sets of dogs 11 from dropping back into engagement with the ratchet teeth. Thus the shaft 2 is automatically uncoupled from its driving connection with the arbor 13, whereby the back-fire movement will not be imparted to the mechanism to cause breakage or damage thereto.

I claim:

1. In an engine-starter mechanism, a shaft, means for driving the same in one direction, a ratchet-wheel fast upon said shaft, a gear-wheel loosely mounted on the shaft, one or more dogs carried by the gear-wheel engageable with the ratchet-wheel, a collar revoluble about the shaft, an oscillatory disk mounted upon the collar, means for limiting movement of the disk relative to said collar, normally registered tongues projecting from one face of the collar and disk for engagement with the dogs following a reverse movement of the shaft, and means for locking the collar against such reverse movement.

2. In an engine-starter mechanism, a shaft, means for driving the same in one direction, a ratchet-wheel fast upon said shaft, a gear-wheel loosely mounted on the shaft, one or more dogs carried by the gear-wheel engageable with the ratchet-wheel, a collar revoluble about the shaft, an oscillatory disk mounted upon the collar, means for limiting movement of the disk relative to said collar, tongues projecting from one face of the disk between the body of the dogs and ratchet-wheel for engagement with the body of said dogs when a reverse movement of the shaft is had, ratchet-teeth carried by the collar, and a fixed dog for holding the collar against movement in a reverse direction from the normal direction of rotation of the shaft.

In testimony that I claim the foregoing I have hereunto set my hand at Racine, in the county of Racine and State of Wisconsin, in the presence of two witnesses.

HENRY R. SIEVERKROPP.

Witnesses:
H. N. BACON,
THOS. ALLEN.